Patented May 6, 1941

2,240,513

UNITED STATES PATENT OFFICE 2,240,513

PROCESS FOR PREPARING CYCLOPROPANE

John M. Ort, Rockville Centre, N. Y., assignor to E. R. Squibb & Sons, New York, N. Y., a corporation of New York No Drawing. Application June 23, 1939, Serial No. 280,847

12 Claims. (Cl. 260—666)

This invention relates to the preparation of cyclopropane.

Cyclopropane has heretofore been prepared by the treatment of trimethylene dihalides with metal reduction agents; e. g., by the reaction of trimethylene dibromide with zinc in about 86% ethanol (Lott and Christiansen, Jour. A. Ph. A., 19 (1930) 341).

An improvement with respect to reaction time and yield has been obtained by effecting the reduction of trimethylene dihalides in the presence of a catalyst consisting of a small proportion of a dissolved salt of a metal capable of being displaced by the metal reduction agent (as described and claimed in the copending application of W. A. Lott, Serial No. 139,987, filed April 30, 1937, now Patent No. 2,211,787). The addition of the metal salt, however, results in an increase in the production of hydrogen (e. g., hydrogen may constitute 10–20% of the total evolved gas), and the excessive hydrogen evolution gives rise to mechanical difficulties in the purification and recovery of cyclopropane. Cyclopropane is a gas (B. P. 34° C.) and the evolved gas mixture containing it is usually passed through a rectifying column to return vaporized alcohol, then through scrubbers into a refrigerated condenser to condense the cyclopropane. Non-condensable gases, such as hydrogen, interfere with the proper condensation of the alcohol, render the scrubbing less effective, interfere with the condensation of the cyclopropane, and decrease the yield of condensed cyclopropane.

It is the object of this invention to provide an improved process of preparing cyclopropane from trimethylene dibromide or trimethylene chlorobromide, in which the production of hydrogen is minimized.

It has been found that the production of hydrogen in the reaction of trimethylene dibromide or trimethylene chlorobromide with a metal reduction agent can be materially reduced, and even substantially prevented, by effecting the reaction in the presence of a small proportion of an alkali, notably a substantially insoluble alkali such as $Mg(OH)_2$, and that, in addition, the alkali has a favorable influence on the cyclopropane-forming reaction itself. Furthermore, the presence of the alkali greatly diminishes the corrosion of the plant equipment by the acidic reaction mixture.

The invention is applicable generally to processes for the production of cyclopropane by the reduction of trimethylene dibromide or trimethylene chlorobromide. Thus, the utilizable metal reduction agents include, inter alia, zinc and magnesium; and the reaction medium may range in composition from the conventional essentially alcoholic (lower aliphatic alcohol, e. g., methyl, ethyl, or isopropyl) to the essentially aqueous (i. e., media constituted in major proportion, or entirely, of water), as described and claimed in my copending application Serial No. 280,849 and the copending application of W. G. Christiansen, Serial No. 280,815 (now Patent No. 2,206,878), filed simultaneously herewith. The utilizable alkalies include, inter alia, NaOH, $Ca(OH)_2$, $Na_2CO_3$, and, notably, $Mg(OH)_2$; and the utilizable catalysts include, inter alia, the especially advantageous dissolved salts of noble metals described and claimed in my copending application Serial No. 280,848, filed simultaneously herewith (now Patent No. 2,206,917).

The $Mg(OH)_2$, for example, is preferably added in about 5 to 15% by weight of the reaction mixture, the optimum amount being dependent on the alcohol-water ratio in the reaction medium, the nature and amount of the various catalysts present, and probably also on the operating temperature.

Alkalies substantially insoluble in the reaction mixture, e. g., $Mg(OH)_2$, are preferred, since they provide a reservoir of potential alkali capable of combining with acid without having an initially-high OH-ion concentration.

The following examples are illustrative of the invention (the ingredients being mixed substantially in the given sequence, especially when noble metal salts are used as catalysts):

Example 1

A mixture of the following:

| | | |
|---|---|---|
| 95% ethanol | cc | 150 |
| Distilled water | cc | 15 |
| 5% $FeCl_3$ solution | cc | 3 |
| Zinc dust | g | 51.8 |
| Dry $Mg(OH)_2$ | g | 20.0 |
| Pasty sludge from a prior run, added as a catalyst; replaceable by a small amount of NaBr or KBr | g | 20.0 | is refluxed (about 80° C.), and 62.4 g. trimethylene chlorobromide is added slowly so as to produce the desired rate of evolution of cyclopropane; and about 98% yield is obtained, the evolved gases containing only 1.1% hydrogen.

Example 2

A mixture of the following:

| | | |
|---|---|---|
| 95% ethanol | cc | 400 |
| Distilled water | cc | 100 |
| 5% FeCl$_3$ solution | cc | 8 |
| 5% CuSO$_4$ solution | cc | 8 |
| KBr | g | 3 |
| Zinc dust | g | 75 |
| Dry Mg(OH)$_2$ | g | 70 | is refluxed (about 80° C.) and 125 g. trimethylene chlorobromide is added slowly so as to produce the desired rate of evolution of cyclopropane; an 87% yield is obtained, the evolved gases containing 2.2% hydrogen.

Example 3

A mixture of the following:

| | | |
|---|---|---|
| Distilled water | cc | 165 |
| KBr | g | 1 |
| Acimul (a commercial mixture of glycerol stearates) | g | 6.24 |
| 5% FeCl$_3$ solution | cc | 3 |
| Zinc dust | g | 51.8 |
| Dry Mg(OH)$_2$ | g | 20.0 | is heated on the steam bath and 62.4 g. trimethylene chlorobromide is added slowly so as to produce the desired rate of evolution of cyclopropane; an approximately 75% yield is obtained.

Example 4

A mixture of the following:

| | | |
|---|---|---|
| Distilled water | cc | 390 |
| 5% FeCl$_3$ solution | cc | 8 |
| KBr | g | 3 |
| Acimul | g | 5 |
| 95% ethanol | cc | 50 |
| Zinc dust | g | 65 |
| 5% CuSO$_4$ solution | cc | 8 |
| Dry Mg(OH)$_2$ | g | 70 | is heated on the steam bath and 125 g. trimethylene chlorobromide is added slowly so as to produce the desired rate of evolution of cyclopropane; a 90% yield is obtained.

Example 5

A mixture of the following:

| | | |
|---|---|---|
| 95% ethanol | cc | 80 |
| Water | cc | 240 |
| 5% FeCl$_3$ solution | cc | 6.4 |
| 5% CuSo$_4$ solution | cc | 6.4 |
| KBr | g | 2.4 |
| Powdered zinc | g | 52 |
| Mg(OH)$_2$ | g | 56 | is heated to about 80–90° C., and 128.2 g. trimethylene dibromide is added slowly so as to produce the desired rate of evolution of cyclopropane; an about 97% yield is obtained, the evolved gases containing about 1.5% hydrogen.

Example 6

A mixture of the following:

| | | |
|---|---|---|
| Water | cc | 120 |
| 5% FeCl$_3$ solution | cc | 3 |
| 38% NaOH solution | cc | 60 |
| KBr | g | 1 |
| Powdered zinc | g | 51.8 | is heated on a steam bath, and 62.4 g. trimethylene chlorobromide is added fast enough to produce a smooth and even evolution of cyclopropane; an about 87% yield is obtained, the evolved gases containing 6% hydrogen.

Example 7

Substitution of 25 g. Ca(OH)$_2$ for the NaOH in the preceding example (total H$_2$O to be 200 cc.) gives an efficient production of cyclopropane relatively low in hydrogen content.

Example 8

A mixture of the following:

| | | |
|---|---|---|
| Zinc dust | g | 60 |
| Distilled water | cc | 200 |
| NaBr | g | 2.4 |
| Dry Mg(OH)$_2$ | g | 8 | is heated in a steam bath and 128.2 g. trimethylene dibromide is added slowly so as to produce the desired rate of evolution of cyclopropane; an about 95% yield is obtained, the evolved gases containing a little over 5% hydrogen.

Example 9

A mixture of the following:

| | | |
|---|---|---|
| Distilled water | cc | 400 |
| 95% ethanol | cc | 40 |
| Zinc dust | g | 200 |
| Aqueous AgNO$_3$ solution containing 0.0.175 g. AgNO$_3$ | cc | 335 |
| NaBr | g | 8 |
| Dry Mg(OH)$_2$ | g | 45 | is heated at about 80–90° C. and 454 g. trimethylene dibromide is added slowly so as to produce the desired rate of evolution of cyclopropane; an about 95% yield is obtained, the evolved gases containing less than 2% hydrogen. The AgNO$_3$ solution should be added slowly with vigorous stirring—2 to 3 minutes, for example, being allowed for this addition—to insure uniform distribution of the catalyst.

Example 10

A plant-scale production of cyclopropane is carried out as follows: 90 gallons of distilled water and 240 pounds of zinc dust are placed in a jacketed, internally zinc-coated still and briskly agitated; then 74 g. of AgNO$_3$ dissolved in 25 gallons of distilled water is added gradually to the swirling contents in the still, and then 10 pounds of NaBr is added and dissolved, followed by 45 pounds dry Mg(OH)$_2$ and 8 gallons of 95% ethanol; the still is then closed and steam admitted to the jacket until the temperature of the reaction mixture reaches about 50° C., whereupon the steam is cut off and the slow addition of 400 pounds of trimethylene chlorobromide begun; the reaction being exothermic, cold water is passed into the jacket to prevent the temperature rising above 60° C., and the rate of addition of the chlorobromide is increased periodically until it reaches about 100 pounds per hour. The evolved cyclopropane is recovered in over 83% yield with a low hydrogen content.

The residue in the still is filtered while still warm in order to get the filtrate for bromine recovery, the filtration proceeding smoothly and rapidly despite the presence of Zn(OH)$_2$ and some Mg(OH)$_2$. The Mg(OH)$_2$ in addition greatly reduces the acidity of the reaction mixture and hence also reduces the corrosion of the plant equipment.

The invention may be variously otherwise embodied within the scope of the appended claims.

I claim:

1. The process of preparing cyclopropane which comprises reacting a compound of the group consisting of trimethylene dibromide and trimethylene chlorobromide with a metal reduction agent in the presence of an alkali.

2. The process of preparing cyclopropane which comprises reacting a compound of the group consisting of trimethylene dibromide and trimethylene chlorobromide with a metal reduction agent in the presence of $Mg(OH)_2$.

3. The process of preparing cyclopropane which comprises reacting a compound of the group consisting of trimethylene dibromide and trimethylene chlorobromide with a metal reduction agent in the presence of 5 to 15% of $Mg(OH)_2$.

4. The process of preparing cyclopropane which comprises reacting trimethylene dibromide with zinc in the presence of an alkali.

5. The process of preparing cyclopropane which comprises reacting trimethylene chlorobromide with zinc in the presence of an alkali.

6. The process of preparing cyclopropane which comprises reacting a compound of the group consisting of trimethylene dibromide and trimethylene chlorobromide with zinc in an aqueous lower-aliphatic-alcohol medium in the presence of an alkali.

7. The process of preparing cyclopropane which comprises reacting a compound of the group consisting of trimethylene dibromide and trimethylene chlorobromide with zinc in an aqueous ethanol medium in the presence of $Mg(OH)_2$.

8. The process of preparing cyclopropane which comprises reacting a compound of the group consisting of trimethylene dibromide and trimethylene chlorobromide with a metal reduction agent in the presence of an alkali and of a dissolved salt of a metal capable of being displaced by the metal reduction agent.

9. The process of preparing cyclopropane which comprises reacting a compound of the group consisting of trimethylene dibromide and trimethylene chlorobromide with a metal reduction agent in the presence of $Mg(OH)_2$ and of a dissolved salt of a metal capable of being displaced by the metal reduction agent.

10. The process of preparing cyclopropane which comprises reacting a compound of the group consisting of trimethylene dibromide and trimethylene chlorobromide with a metal reduction agent in an aqueous lower-aliphatic-alcohol medium in the presence of an alkali and of a dissolved salt of a metal capable of being displaced by the metal reduction agent.

11. The process of preparing cyclopropane which comprises reacting a compound of the group consisting of trimethylene dibromide and trimethylene chlorobromide with zinc in the presence of $Mg(OH)_2$ and of a dissolved salt of a metal capable of being displaced by zinc.

12. The process of preparing cyclopropane which comprises reacting a compound of the group consisting of trimethylene dibromide and trimethylene chlorobromide with zinc in aqueous ethanol, in the presence of $Mg(OH)_2$ and of a dissolved salt of a metal capable of being displaced by zinc.

JOHN M. ORT.